(12) United States Patent
Tanaka (10) Patent No.: US 11,320,317 B2
(45) Date of Patent: May 3, 2022

(54) ATTACHMENT STRUCTURE OF TEMPERATURE SENSOR

(71) Applicant: Yazaki Corporation, Tokyo (JP)

(72) Inventor: Hiraku Tanaka, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 397 days.

(21) Appl. No.: 16/519,712

(22) Filed: Jul. 23, 2019

(65) Prior Publication Data

US 2020/0033196 A1    Jan. 30, 2020

(30) Foreign Application Priority Data

Jul. 24, 2018 (JP) .............................. JP2018-138379

(51) Int. Cl.
| | |
|---|---|
| *G01K 1/00* | (2006.01) |
| *G01K 1/14* | (2021.01) |
| *H01M 10/48* | (2006.01) |
| *H01M 50/20* | (2021.01) |
| *H01M 50/502* | (2021.01) |
| *H01M 50/543* | (2021.01) |

(52) U.S. Cl.
CPC ............ *G01K 1/14* (2013.01); *H01M 10/486* (2013.01); *H01M 50/20* (2021.01); *H01M 50/502* (2021.01); *H01M 50/543* (2021.01); *H01M 2200/106* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2004/0005794 A1 | 1/2004 | Yamashita | |
| 2004/0165648 A1* | 8/2004 | Ikeda | G01K 1/14 |
| | | | 374/208 |
| 2009/0022206 A1* | 1/2009 | Shibuya | B60L 50/66 |
| | | | 374/208 |
| 2011/0019714 A1* | 1/2011 | Perry | B29C 45/14639 |
| | | | 374/183 |

(Continued)

FOREIGN PATENT DOCUMENTS

| | | |
|---|---|---|
| CN | 202495555 U | 10/2012 |
| CN | 108731830 A | 11/2018 |

(Continued)

*Primary Examiner* — Mirellys Jagan
(74) *Attorney, Agent, or Firm* — Sughrue Mion, PLLC (57) ABSTRACT

An attachment structure of temperature sensor includes: a temperature sensor for attached to a single battery and detecting a temperature of the single battery; a temperature measuring element provided in the temperature sensor and detecting the temperature of the single battery; a sensor body provided in the temperature sensor and integrally formed with the temperature measuring element; a housing holding case provided with the single battery, having a engagement part engageable with the temperature sensor, the housing holding case for housing the temperature sensor; an elastic part having an arm shape, projected from the sensor body, and engageable with the engagement part; and a flat part provided in the elastic part, and pressing a pressing surface of an attachment tool against the elastic part when the temperature sensor is housed in the housing holding case.

5 Claims, 6 Drawing Sheets

(56) References Cited

U.S. PATENT DOCUMENTS

| | | | | |
|---|---|---|---|---|
| 2014/0010266 A1* | 1/2014 | Nishida | ................... | G01K 1/14 |
| | | | | 374/208 |
| 2014/0233606 A1* | 8/2014 | Nishida | ............... | H01M 10/486 |
| | | | | 374/208 |
| 2018/0364108 A1* | 12/2018 | Tanaka | ..................... | G01K 1/16 |
| 2020/0014083 A1* | 1/2020 | Matsushima | ............ | G01K 1/14 |

FOREIGN PATENT DOCUMENTS

| JP | 2004031006 A | 1/2004 |
|---|---|---|
| JP | 2004233267 A | 8/2004 |
| JP | 2011017638 A | 1/2011 |
| JP | 2014-044850 A | 3/2014 |

\* cited by examiner

ATTACHMENT STRUCTURE OF TEMPERATURE SENSOR

CROSS-REFERENCE TO RELATED APPLICATION

The present application is based on, and claims priority from Japanese Patent Application No. 2018-138379, filed on Jul. 24, 2018, the entire contents of which are incorporated herein by reference.

TECHNICAL FIELD

The disclosure relates to an attachment structure of a temperature sensor attached to each of single batteries of a battery pack to which the single batteries are connected and detecting a temperature of each of the single batteries.

BACKGROUND

Figure 7:
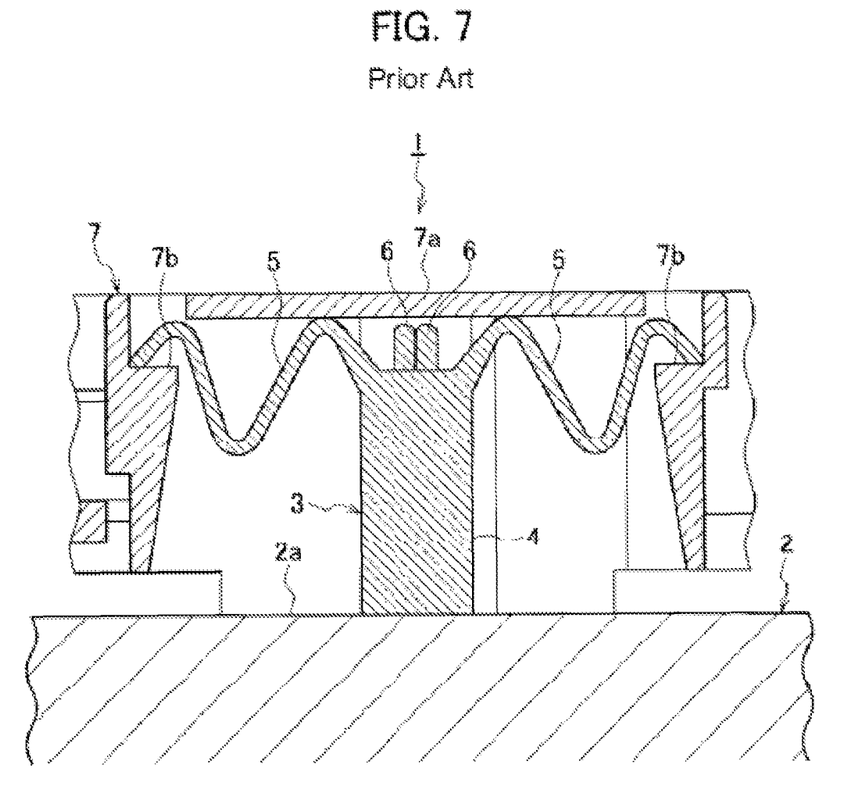
FIG. 7 is a cross-sectional view of a known attachment structure of a temperature sensor.

As an attachment structure of a temperature sensor detecting a temperature of a single battery in a battery module (battery pack), the battery module being mounted on a vehicle such as an electric vehicle or hybrid electric vehicle and used as a driving source of the vehicle, a structure disclosed in JP 2014-044850 A as illustrated in FIG. 7 is known.

A known attachment structure 1 of a temperature sensor 3 illustrated in FIG. 7 is the structure that brings the temperature sensor 3 into contact with a single battery 2 in a battery module and allows the temperature sensor 3 to detect a temperature of the single battery. The temperature sensor 3 includes a main body part 4 made of synthetic resin formed by insert molding a temperature detecting element (not illustrated) such as a positive temperature coefficient (PTC) thermistor on a side of a contact surface of the single battery 2, and a pair of arm-shaped spring parts 5 made of synthetic resin and projecting outward from sides in a width direction of the main body part 4. A pair of lead cables 6 are led out from an upper end of the main body part 4. The temperature detecting element is accommodated in a lower end of the main body part 4.

The temperature sensor 3 is held so as to be covered by a holding member 7 provided on a side of the battery module. The temperature sensor 3 is pressed downward at the main body part 4 by elastic force of the pair of arm-shaped spring parts 5 pressed by a lid part 7a of the holding member 7, and is fixed in a state of being brought into contact with an upper surface 2a of the single battery 2. At this time, the spring parts 5 are held by stepped spring holding parts 7b of the holding member 7.

SUMMARY

In the known attachment structure 1 of the temperature sensor 3, the pair of arm-shaped spring parts 5 projecting outward from the sides in the width direction of the main body part 4 are bent in an M shape, and the arm-shaped spring parts 5 are angled with respect to force (fitting force) of pressing the lower end of the main body part 4 on a side of the temperature sensor, therefore, an area to which the fitting force is applied is small. Accordingly, when the main body part 4 is assembled on the side of the single battery 2, the arm-shaped spring parts 5 become opened, causing the force to press the lower end of the main body part 4 against the side of the upper surface 2a of the single battery 2 to be unstable.

The disclosure is made in light of the above-described problem, and the disclosure is directly to provide an attachment structure of a temperature sensor that can securely press the temperature sensor in a stable state when the temperature sensor is assembled to a side of a single battery.

An attachment structure of temperature sensor according to an embodiment includes: a temperature sensor for attached to a single battery and detecting a temperature of the single battery; a temperature measuring element provided in the temperature sensor and detecting the temperature of the single battery; a sensor body provided in the temperature sensor and integrally formed with the temperature measuring element; a housing holding case provided with the single battery, having a engagement part engageable with the temperature sensor, the housing holding case for housing the temperature sensor; an elastic part having an arm shape, projected from the sensor body, and engageable with the engagement part; and a flat part provided in the elastic part, and pressing a pressing surface of an attachment tool against the elastic part when the temperature sensor is housed in the housing holding case.

With the attachment structure of temperature sensor according to the embodiment, because the flat part pressed by the pressing surfaces of the attachment tool is provided in the elastic part having the arm shape, the temperature sensor can be securely pressed in the stable state when the temperature sensor is housed and assembled in the housing holding case.

DETAILED DESCRIPTION

Hereinafter, an embodiment is described on the basis of the drawings.

Figure 1:
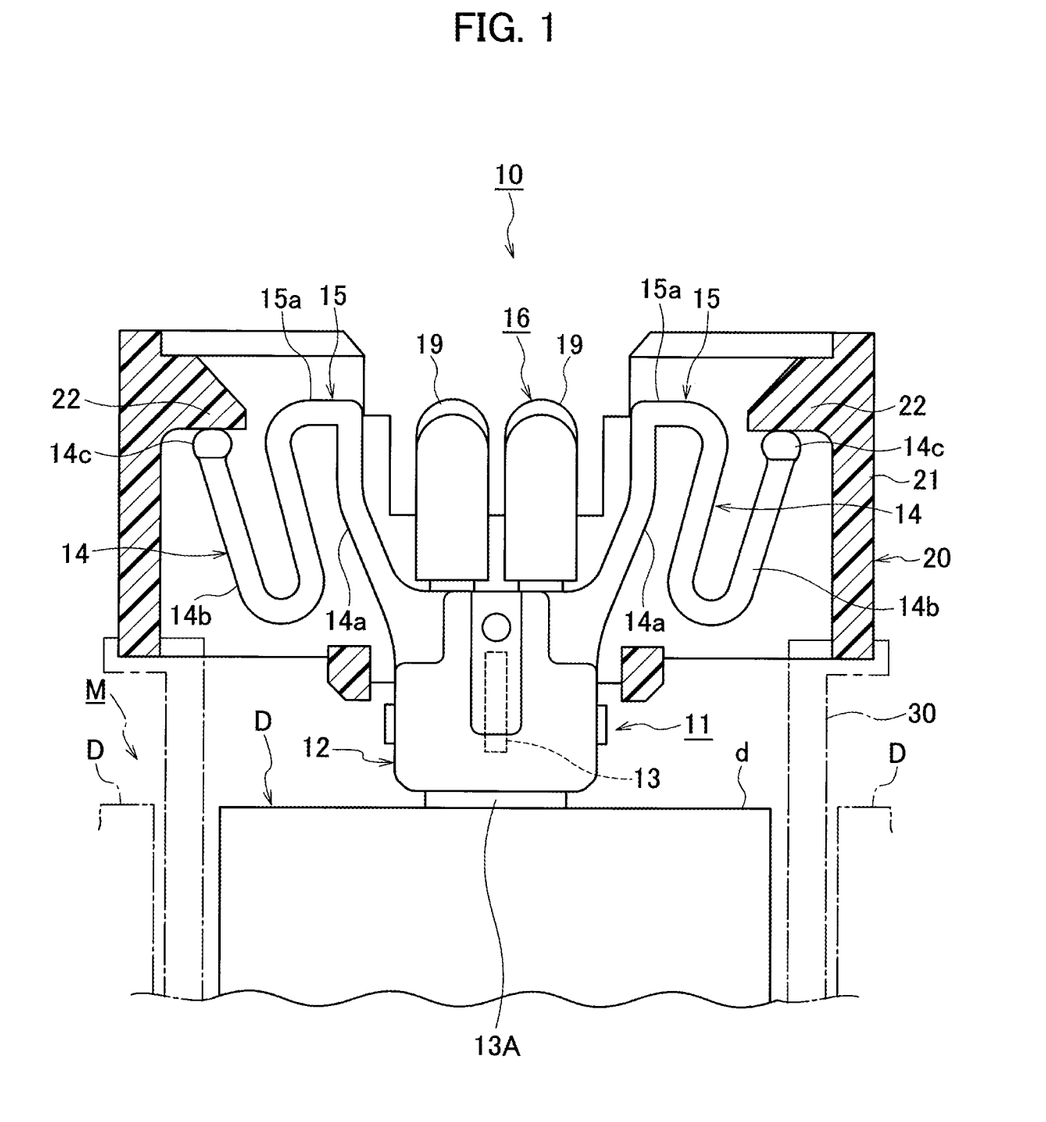
FIG. 1 is a front view of an attachment structure of a temperature sensor according to an embodiment, illustrated in a partial cross section.

As illustrated in FIG. 1, an attachment structure 10 of a temperature sensor 11 according to the embodiment is attached to each of single batteries (battery cells) D of a battery pack (battery module) M to which the single batteries D are connected and detects a temperature of each of the single batteries D. The attachment structure 10 includes the temperature sensor 11 for detecting a temperature of the single battery D, and a housing holding case 20 made of synthetic resin and housing a sensor body 12 of the temperature sensor 11.

Figure 2:
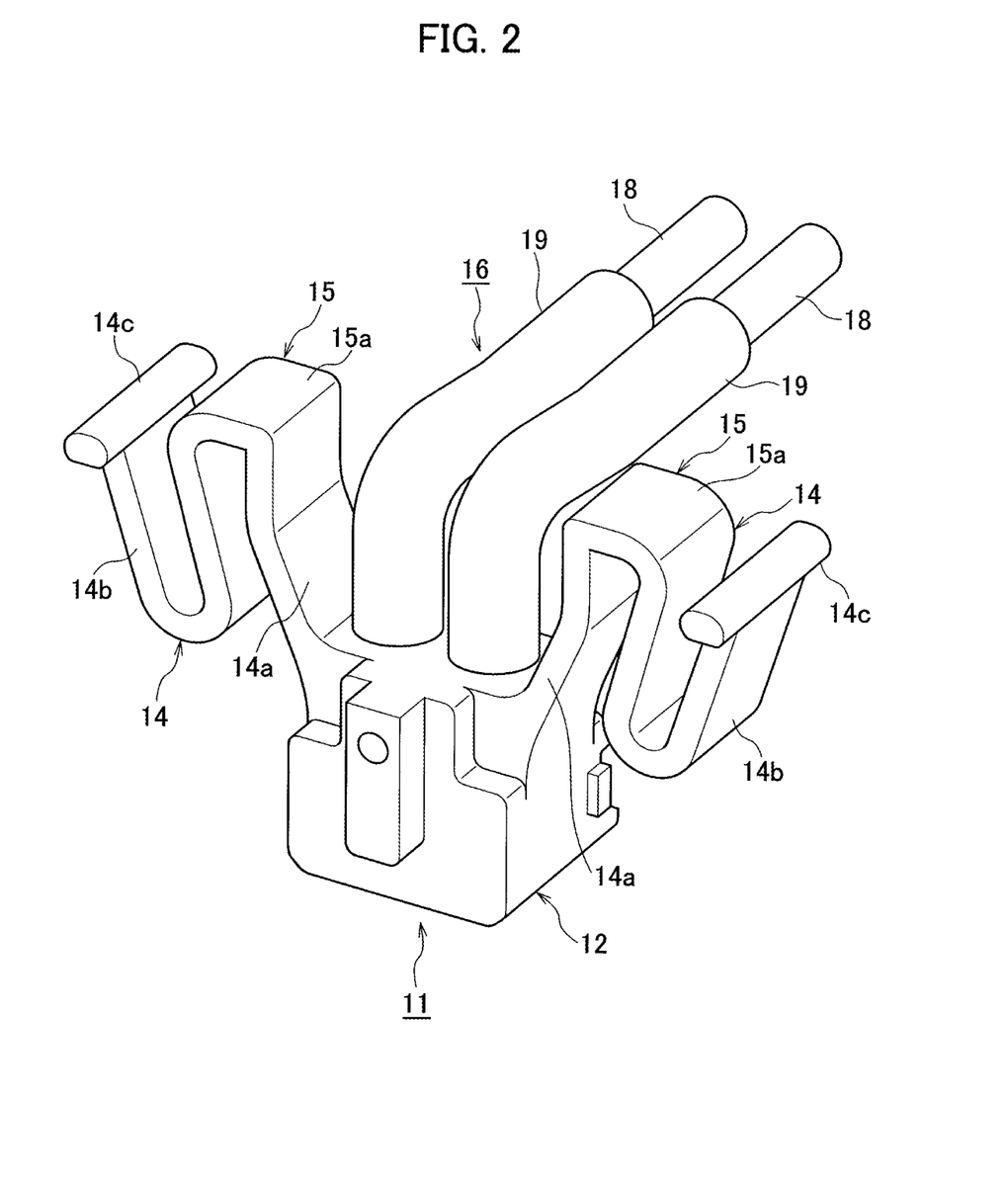
FIG. 2 is a perspective view of the temperature sensor.
Figure 3:
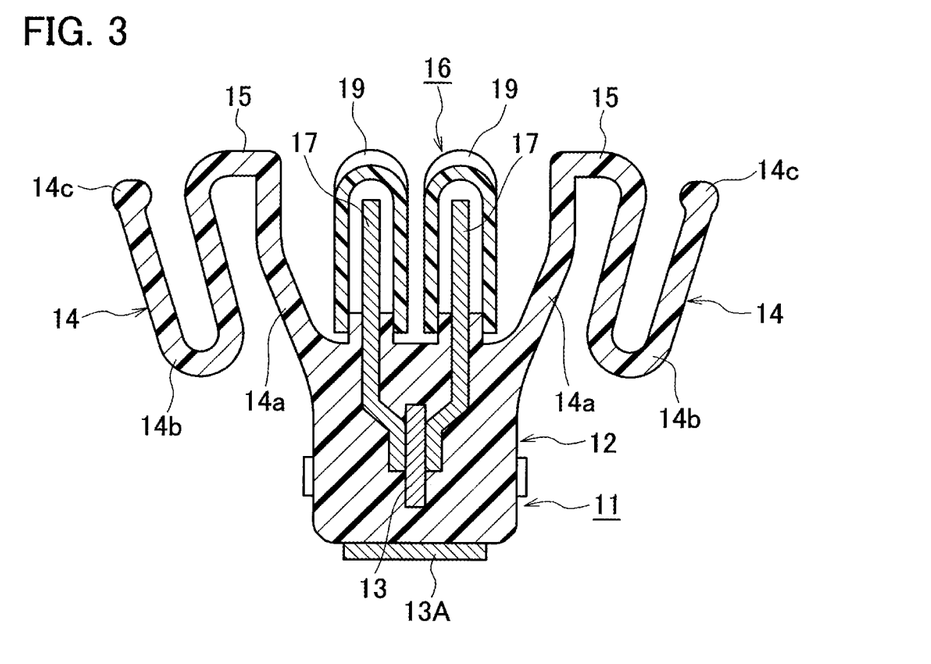
FIG. 3 is a cross-sectional view of cutting the temperature sensor from a lateral side.
Figure 4:
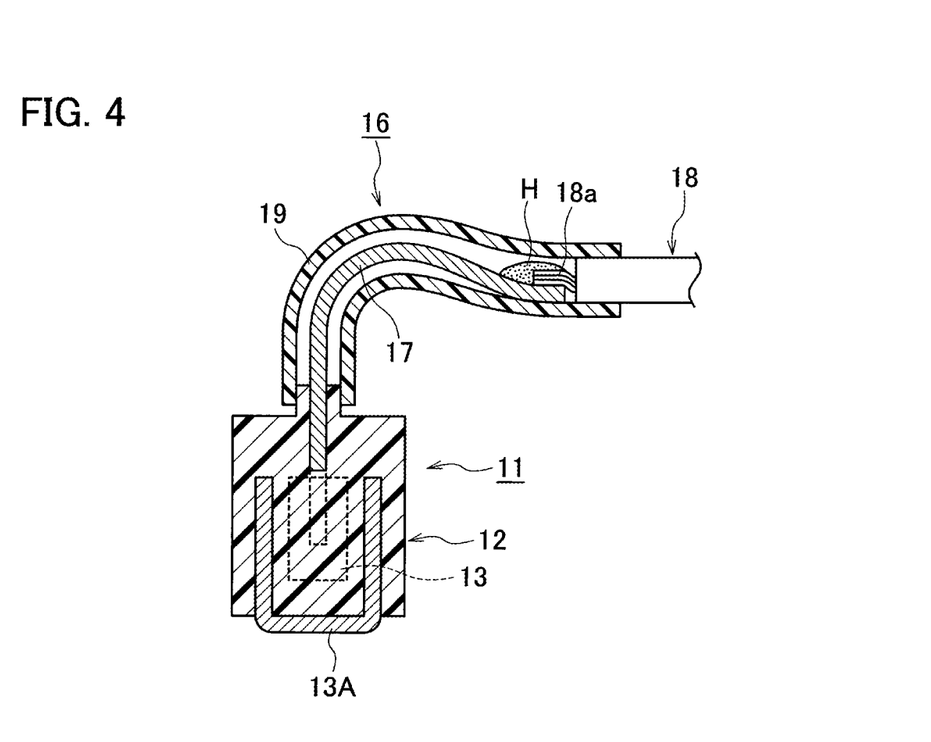
FIG. 4 is a cross-sectional view of cutting the temperature sensor from a front side.

As illustrated in FIGS. 2 to 4, the temperature sensor 11 includes: a PTC thermistor (temperature measuring element) 13 being an element having a positive temperature characteristic (whose resistance increases as the temperature rises); the sensor body 12 made of synthetic resin and integrally formed with the PTC thermistor 13 by insert molding; a pair of arm-shaped elastic parts 14 each integrally projected from each of lateral sides of the sensor body 12 and engaged with each of engagement parts 22 of the housing holding case 20; and a cable part 16 connected to the PTC thermistor 13.

Figure 5:
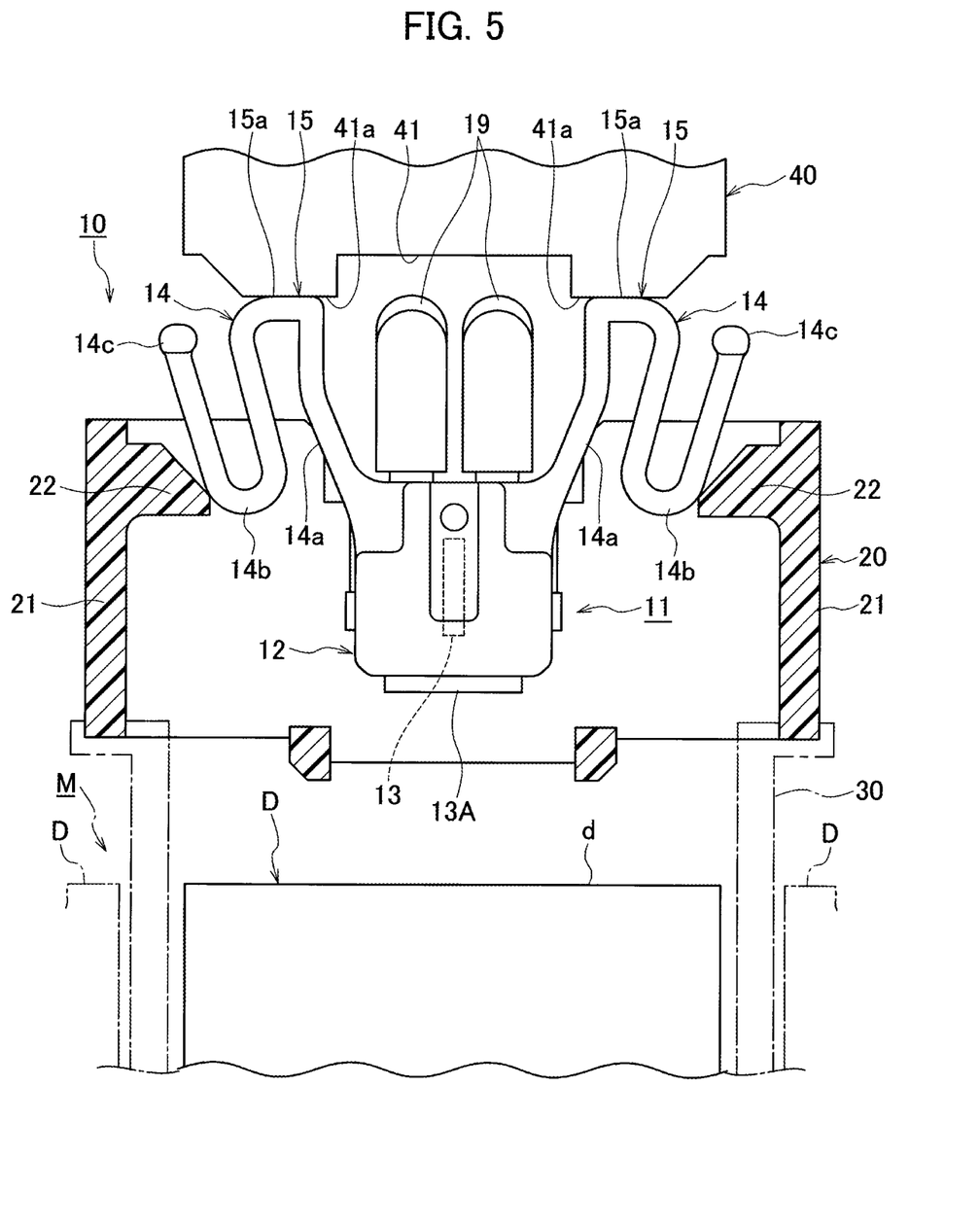
FIG. 5 is a front view of the temperature sensor in a state of immediately before being assembled to a side of a single battery, illustrated in partial cross section.
Figure 6:
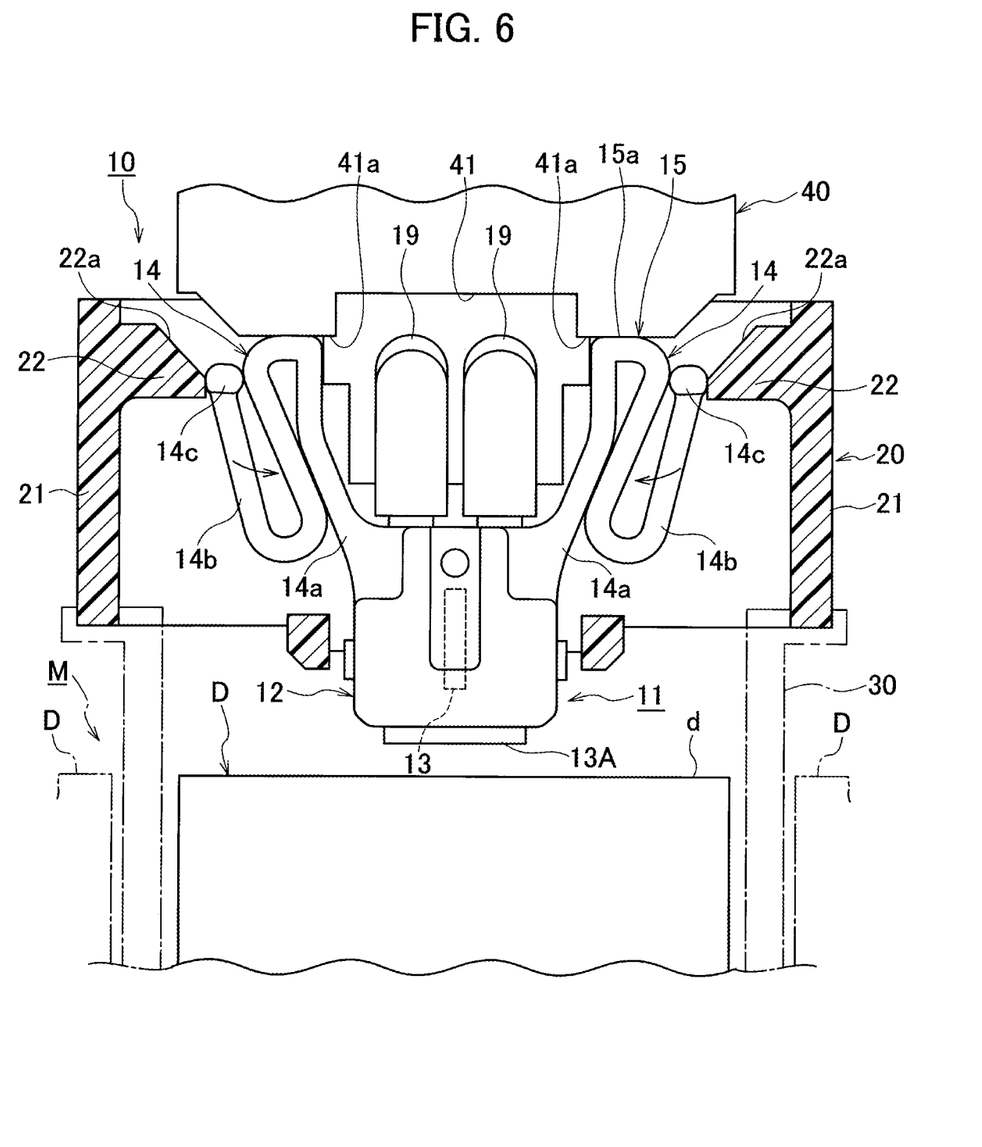
FIG. 6 is a front view of the temperature sensor in a state of being assembled to the side of the single battery, illustrated in partial cross section.

As illustrated in FIGS. 1 to 6, each of the elastic parts 14 includes: a raised part 14a raised further than an upper corner edge part on the lateral side of the sensor body 12; a U-shaped flexible part 14b formed continuously from the raised part 14a; and a tip end part 14c having a rod shape and integrally projected at a tip end of the flexible part 14b. Between the raised part 14a and the flexible part 14b of each of the elastic parts 14, that is, at a center of each of the elastic parts 14, a flat part 15 is integrally formed, the flat part 15 pressing an attachment tool 40 against each of the elastic parts 14 when the sensor body 12 is housed and assembled in the housing holding case 20. As illustrated in FIGS. 5 and 6, both of lateral parts of a lower surface 41 of the attachment tool 40 are formed as pressing surfaces 41a. Each of the pressing surfaces 41a is made to abut against a flat surface 15a on an upper side of the flat part 15 of each of the elastic parts 14.

As illustrated in FIGS. 5 and 6, when performing assembling by pressing the attachment tool 40 against the flat parts 15 and housing the sensor body 12 in the housing holding case 20, the pressing surfaces 41a of the attachment tool 40 are abutted against the flat surfaces 15a of the flat parts 15, and meanwhile, the U-shaped flexible parts 14b are made to flexurally deform inward.

As illustrated in FIGS. 3 and 4, the cable part 16 connected to the PTC thermistor 13 includes: a pair of lead frames 17 connected to the PTC thermistor 13; a pair of cables 18 each of whose core cables 18a is connected to each of the lead frames 17; and shrink tubes 19 made of rubber and covering the lead frames 17 and the core cables 18a of the cables 18.

The cable part 16 is formed by being bent in an L shape. When the sensor body 12 is housed and assembled in the housing holding case 20, the cable part 16 is separated away from the pressing surfaces 41a of the attachment tool 40.

As illustrated in FIGS. 1, 5, and 6, the housing holding case 20 housing the sensor body 12 is arranged at a position separated from an upper surface d of the single battery D while interposing a holding member 30 provided on a side of the single battery D. The housing holding case 20 is formed of synthetic resin and in a square cylinder shape. Each of the engagement parts 22 is integrally projected at an upper part on an inner side of each of lateral walls (peripheral wall part) 21 of the housing holding case 20. Then, as illustrated in FIG. 1, when the sensor body 12 is housed and assembled in the housing holding case 20 by using the attachment tool 40, each of the tip end parts 14c of the pair of elastic parts 14 is engaged with each of the engagement parts 22.

As illustrated in FIG. 4, on a lower side of the sensor body 12 of the temperature sensor 11, an aluminum plate 13A having a substantially U shape is integrally formed by insert molding while being exposed. The aluminum plate 13A comes into contact with the upper surface d of the single battery D. The lead frame 17 and the core cable 18a of the cable 18 are connected by soldering. A portion thus soldered is indicated by a symbol H in FIG. 4.

With the attachment structure 10 of the temperature sensor 11 according to the embodiment, as illustrated in FIG. 5, when performing assembling by housing the sensor body 12 of the temperature sensor 11 in the housing holding case 20 provided while interposing the holding member 30 on the side of the single battery D, the pair of pressing surfaces 41a provided respectively on the lateral parts of the lower surface 41 of the attachment tool 40 are pressed against the flat surfaces 15a on the upper sides of the flat parts 15 provided respectively in the pair of arm-shaped elastic parts 14 of the sensor body 12. Thereafter, the tip end part 14c of each of the arm-shaped elastic parts 14 slides on an inclined surface 22a of each of the engagement parts 22 of the housing holding case 20, and as indicated by an arrow in FIG. 6, the flexible part 14b of each of the elastic parts 14 flexurally deforms inward toward the flat part 15. At this time, the pair of pressing surfaces 41a of the attachment tool 40 respectively abut against the flat surfaces 15a of the flat parts 15, causing force to press the attachment tool 40 to be concentrated at the abutted portions to prevent the pair of elastic parts 14 from opening outward, allowing the attachment tool 40 to be pressed easily and securely to a position of the engagement parts 22 of the housing holding case 20 in a stable state.

Further, when the flat parts 15 of the pair of elastic parts 14 are respectively pressed by the pair of pressing surfaces 41a of the attachment tool 40, the cable part 16 extended from the upper side of the sensor body 12 is separated from the pair of pressing surfaces 41a of the attachment tool 40 by being bent in the L shape. Accordingly, when the temperature sensor 11 is housed and assembled in the housing holding case 20, the cable part 16 does not interfere with the assembling, allowing the attachment tool 40 to be easily pressed. Still further, the temperature sensor 11 can be thinned and downsized.

Then, as illustrated in FIG. 1, when the flat parts 15 of the pair of elastic parts 14 are respectively pressed by the pair of pressing surfaces 41a of the attachment tool 40 until the aluminum plate 13A on the lower side of the sensor body 12 comes into contact with the upper surface d of the single battery D, the tip end parts 14c of the pair of elastic parts 14 are respectively engaged with the engagement parts 22 of the lateral walls 21 and are fixed.

As described above, by providing the flat parts 15 to be pressed by the pressing surfaces 41a of the attachment tool 40 at the center of each of the arm-shaped elastic parts 14 of the sensor body 12, the temperature sensor 11 can be stably pressed when being housed and assembled in the housing holding case 20, improving assembling workability.

Note that in the embodiment, the PTC thermistor is used as the temperature measuring element, however, a negative temperature coefficient (NTC) thermistor or critical temperature resistor (CTR) thermistor can be used as the temperature measuring element.

What is claimed is:

1. An attachment structure of temperature sensor, comprising:

a temperature sensor configured to be attached to a single battery and to detect a temperature of the single battery;

a temperature measuring element provided in the temperature sensor and configured to detect the temperature of the single battery;

a sensor body provided in the temperature sensor and integrally formed with the temperature measuring element;

a housing holding case provided with the single battery, having an engagement part engageable with the temperature sensor, the housing holding case configured to house the temperature sensor; and an elastic part having an arm shape, projected from the sensor body, and engageable with the engagement part, the elastic part including a raised part extending upward from a base of the elastic part and being provided on a lateral side of the sensory body, a U-shaped part formed continuously with the raised part, and a horizontal flat part formed integrally with the U-shaped part and the raised part and provided in a center of the elastic part between the raised part and the U-shaped part, wherein the flat part provided in the elastic part is configured to press a pressing surface of an attachment tool against the elastic part when the temperature sensor is housed in the housing holding case.

2. The attachment structure of claim 1, wherein
when the temperature sensor is housed in the housing holding case by pressing the pressing surface of the attachment tool against the flat part, a side of a tip end part of the elastic part is made to flexurally deform inward toward the flat part.

3. The attachment structure of claim 1, further comprising
a cable part connected to the temperature measuring element, wherein:

the cable part includes a lead frame connected to the temperature measuring element, a cable whose core cable is connected to the lead frame, and a shrink tube covering the lead frame and the core cable; and the cable part is formed by being bent in an L shape, and when the temperature sensor is housed in the housing holding case by the attachment tool, the cable part is separated away from the pressing surface of the attachment tool.

4. The attachment structure of claim 1, wherein
the engagement part is projected on an inner side of a peripheral wall part of the housing holding case, and
a tip end part of the elastic part is engaged with the engagement part.

5. The attachment structure of claim 1, wherein
the elastic part is provided on each of lateral sides of the sensor body, and
the flat part is provided at a center of the elastic part.

\* \* \* \* \*